Dec. 10, 1935.  T. W. STERLING  2,023,774
STABLE STALL
Filed April 20, 1934   2 Sheets-Sheet 2
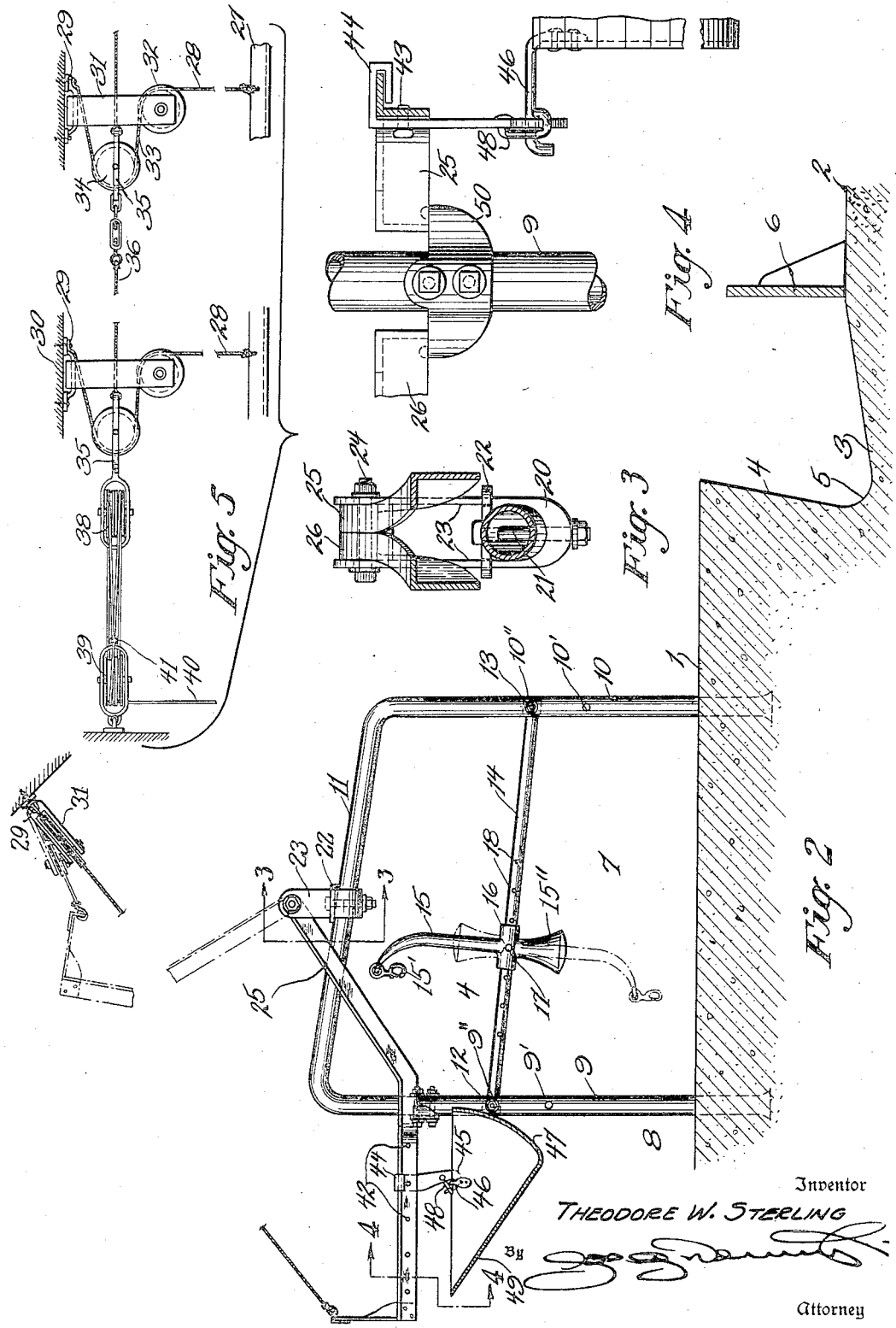
Inventor
THEODORE W. STERLING
By [signature]
Attorney Patented Dec. 10, 1935

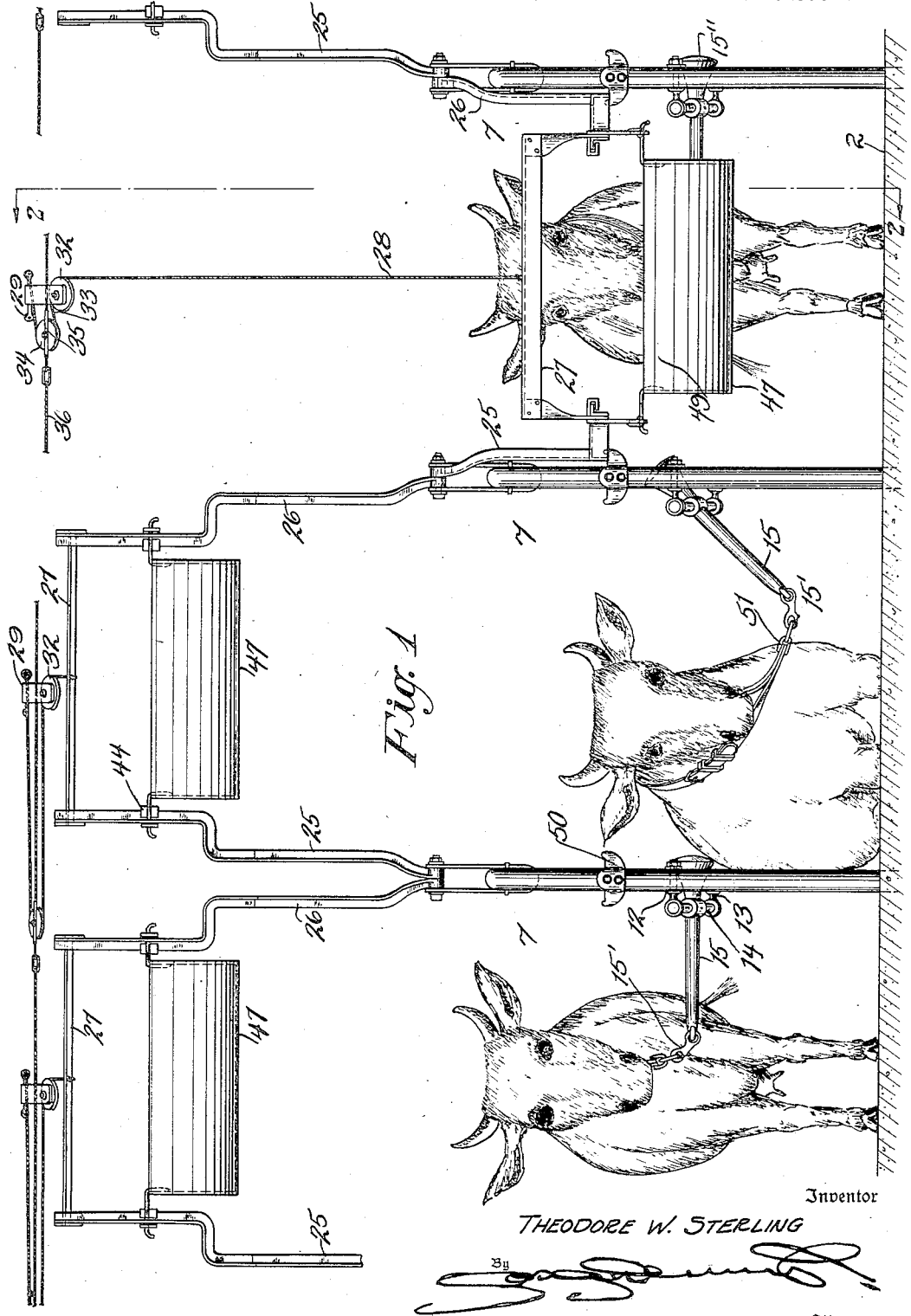

2,023,774

UNITED STATES PATENT OFFICE 2,023,774

STABLE STALL

Theodore W. Sterling, Buckingham Valley, Pa.

Application April 20, 1934, Serial No. 721,529

9 Claims. (Cl. 119—27)

My invention is designed to provide improved means for tethering and feeding cattle in a stable.

In accordance with my invention, each animal is secured to a counterweighted tie bar, which is movable in a fixed path crosswise of a stall so as to permit the animal to lie down or to stand at will but positioning its hind quarters, when standing, close to the edge of a step at the rear of the stall so as to prevent the animal from fouling the stall.

At the forward end of the stall there is provided a manger comprising a trough having a forwardly extending apron; the manger being vertically movable to permit free forward egress of the animal from the stall when the tie bar is disconnected from the animal's collar and dropped down.

The characteristic features and advantages of my improvements will further appear from the following description and the accompanying drawings in illustration of a preferred embodiment thereof.

In the drawings, Fig. 1 is a front elevation of a row of stalls having my improvements applied thereto; Fig. 2 is a transverse sectional view on the line 2—2 of Fig. 1; Fig. 3 is a transverse sectional view on the line 3—3 of Fig. 2; Fig. 4 is a part sectional elevation of the manger mounting taken on the line 4—4 of Fig. 2; and Fig. 5 is an enlarged view of the manger operating mechanism.

As illustrated in the drawings, a stall platform 1 is built at such distance, say eighteen inches, above the stable floor 2 that a cow can readily step up when walking forward but will not find bottom when tentatively putting a rear foot down over the edge of the step when disposed to try to back down off the platform.

The downwardly inclined floor section 3 and the undercut riser 4 make a reentrant angle with one another and are connected by the curve 5 forming a gutter. A movable splatter board 6 may be temporarily placed at the top of the incline 3.

The platform 1 is preferably floored and is divided by partitions into stalls 7 having an exit passage 8 extending transversely along the front thereof.

The partitions are preferably formed of pipe bent to form posts 9 and 10 having their bottom ends embedded in the concrete platform 1 and their upper ends connected by a rail or cross bar 11.

The posts 9 contain vertically spaced apertures 9' and 9'' and the posts 10 contain vertically spaced apertures 10' and 10'' for the attachment of brackets 12 and 13 at different distances above the platform.

A rod 14 is journalled in bearings formed by each pair of brackets 12, 13 and is rotatable on an axis forming an oblique angle to the platform.

A bent rigid tie bar 15 has a hub 16 sleeved on the rod 14 and adjustably fixed thereto by a pin 17 engaged in one of the apertures 18 spaced axially along the rod 14.

Each rail 11 has a yoke 20 mounted thereon and held in place by a bolt and nut 21 engaging the cross-bar 22 containing apertures for the passage of the legs 23 of the yoke. The upper ends of the legs 23 contain openings for the passage of a bolt 24 having journalled thereon the angle iron bracket arms 25 and 26.

The arm 25 carried by the partition on one side of the stall is connected to the arm 26 carried by the partition on the opposite side of the same stall by a cross-bar 27 to form a manger frame. A rope or tie member 28 is fixed to the cross-bar 27 and to a bracket 29 fixed to the rafters 30 of the stable. The bracket 29 has depending legs 31 between which is journalled a sheave 32 adapted to engage the rope 28 when the latter is pulled into the form of a loop 33 by the engagement and pulling thereof by a sheave 34 journalled in a frame 35 which is connected by a tension member 36 with a similar frame 35 of an adjoining stall. The end frame 35 of a series is connected with a compound block-and-tackle comprising the double pulleys 38 and 39 having the rope 40 roved therethrough. The rope 40 has one end fixed to an eye 41 and its other end dropped downward to a position within the grasp of an operative on the floor so that by pulling on the rope 40 all of the manger frames may be simultaneously lifted and by slacking away the rope 40 all of the manger frames may be simultaneously lowered.

The manger frame arms 25 and 26 contain a series of holes 42 in which may be inserted pins 43 for securing in a desired position the brackets 44 which are sleeved on the angle iron frame members. The brackets 44 terminate in hooks 45 adapted to receive the loops 46 of a trough 47. Latches 48 are pivotally connected to the brackets 44 to prevent the inadvertent disengagement of the hooks 45 from the loops 46. The trough 47 has an inclined front wall 49 forming a forwardly projecting apron to catch any feed dropped by the animal while stretching its head during chewing. A bracket 50 is bolted to each post 9 and forms rests for supporting the arms 25 and 26 in the lower position thereof.

In the intended utilization of my improvements, the cattle or other animals are led or driven over the stable floor 2 and each animal is caused to step up onto the platform 1 at the entrance to an appropriate stall 7. The hub 16 of the tether arm 15 is so positioned along and fastened to the rod 14 that when the snap 15' of the tie rod is hooked on the collar 51 around the neck of the animal, the hind feet of the animal are close to the rear edge of the back step, and the animal is held in such position while standing. In feeding grain to the animal, the brackets 44 are so positioned along the arms 25 and 26 that the tethered animal can reach into the trough 47 but cannot project its snout beyond the lip of the apron 49, hence any grain dropped slides down the apron to the bottom of the trough.

When the animal lies down, the tether rod 15 turns about an axis inclined relatively to the floor level and consequently the end carrying the snap 15' moves downwardly athwart the stall and slightly forward longitudinally of the stall to draw the animal sufficiently forward from the rear step to enable it to lie in comfort. Silage may be fed in the manger and hay beneath the manger at the same time.

When the mangers are not in use they may be drawn upwardly simultaneously by pulling on the rope 40 which draws the pulleys 38 and 39 together and causes the sheaves 32 and 34 to bear against the ropes 28 so as to form loops therein and lift the manger frames to the dot and dash position shown in Fig. 2. The manger may be readily removed from the frames for cleaning and sterilization.

When it is desired to remove an animal from its stall, the mangers are elevated, the snap 15' is disengaged, the counterweight 15'' of the tie bar 15 is dropped down to elevate the snap 15' and the animal can then walk without obstruction into the passage 8 and is led or driven away through such passage without having to step down backward from the platform 1 to the floor 2.

By the utilization of a tether arm swinging crosswise of the stall, and attached to a collar around the neck of the animal, the latter is caused to stand substantially in the center of the stall and is allowed to lie down in comfort and to rise without danger of injuring itself and stand in a predetermined position relative to the manger and the dung gutter. The forward exit from the stall permits the use of a platform much higher above the rear floor than usual. The animal is, therefore, kept clear from any accumulation of dung in the rear gutter both while standing and while lying down. This high platform is readily mounted by an animal entering at the rear of the stall and its height prevents the animal from attempting to back down the rear step.

The adjustability of the tether arm along its supporting rod and its attachment thereto by a single pin permit the ready adaptation of a stall of standard size for the use of animals of different lengths.

The gutter 5 may be readily flushed and brushed and the splatter boards 6 removed so as to provide a sanitary and unobstructed ingress to the stalls.

Having described my invention, I claim:

1. A stall having a fulcrumed tether arm movable in a fixed path crosswise of the stall and having an end movable upwardly and downwardly by the movements of an animal standing behind said bar and tethered to the end thereof.

2. A stall comprising a floor terminating rearwardly in a downward step and a tether arm forwardly of said step and movable upwardly and downwardly in a fixed path crosswise of the stall by the movements of an animal standing back of said tether arm and tethered to a movable end thereof.

3. A stall having a floor and a fulcrumed tether arm adjacent to the front of the stall and movable athwart the stall about an axis oblique to the floor.

4. The combination with a stall, of a manger upwardly and downwardly movable adjacent to the front of the stall and a tethering arm movable in a fixed path crosswise of the stall adjacent to the front thereof and leaving an unobstructed stall behind such arm for positioning an animal within reach of said manger.

5. A stall comprising a floor terminating rearwardly in a downward step, a tether arm movable in a fixed path crosswise of the stall and having an end movable upwardly and downwardly by the movements of an animal standing in back of said arm and tethered to the movable end thereof, and a manger movable upwardly and downwardly adjacent to the front of the stall and within reach of an animal tethered to said arm and in back thereof.

6. In a stable, the combination with a floor and a platform a step-up above said floor of a plurality of partitions dividing said platform into stalls, each of said partitions comprising posts and rails connecting said posts, a tether arm mounted on one of said rails of each partition and movable in a fixed path crosswise of one of said stalls, and a manger mounted on rails of a pair of said partitions, said manger being movable upwardly and downwardly adjacent to the front of the stall formed by the partitions on which the manger is mounted.

7. The combination with a stall, of a manger movable upwardly and downwardly adjacent to the front of said stall, said manger comprising a trough having a forwardly extending apron, and a tether rod movable in a fixed path crosswise of said stall and having an end movable upwardly and downwardly by the movements of an animal standing in back of said rod and tethered to an end thereof within reach of said manger, said rod limiting the movement of an animal tethered thereby relatively to said manger.

8. A stall comprising two pairs of posts and a rail connecting the tops of each pair of said posts, a vertically adjustable rod supported by one pair of said posts, a tether arm mounted on said rod and adjustable axially along said rod, said tether arm being movable in a fixed path crosswise of the stall, a fulcrumed arm supported by each of said rails, and a manger detachably mounted on said arms and movable by the rocking thereof.

9. In a stable, an entrance floor, a platform, a step up above said floor, partitions dividing said platform into stalls and an exit passage, said partitions each comprising posts and a rail connecting said posts and fulcrumed tether bars carried by said rails and swinging upwardly to move an animal backward toward said step and swinging downwardly to move an animal forwardly away from said step.

THEODORE W. STERLING.